(12) United States Patent
Thuvesholmen et al.

(10) Patent No.: US 7,457,413 B2
(45) Date of Patent: Nov. 25, 2008

(54) METHOD AND DEVICE FOR ENCRYPTING A MESSAGE

(75) Inventors: Mikael Thuvesholmen, Malmö (SE); Mads Dore Hansen, Hadsund (DK); Tomas Edso, Lund (SE); Kristofer Skantze, Lund (SE)

(73) Assignee: Anoto AB, Lund (SE)

( * ) Notice: Subject to any disclaimer, the term of this patent is extended or adjusted under 35 U.S.C. 154(b) by 892 days.

(21) Appl. No.: 09/875,101

(22) Filed: Jun. 7, 2001

(65) Prior Publication Data

US 2002/0034300 A1 Mar. 21, 2002

(30) Foreign Application Priority Data

Jun. 7, 2000 (SE) .................................. 0002158

(51) Int. Cl.
*H04L 9/00* (2006.01)

(52) U.S. Cl. ........................... 380/46; 380/258; 380/44; 382/314; 358/478

(58) Field of Classification Search .................. 380/44, 380/46, 258; 708/250, 255; 345/179; 382/314; 358/478

See application file for complete search history.

(56) References Cited

U.S. PATENT DOCUMENTS

| | | | |
|---|---|---|---|
| 4,776,013 A | 10/1988 | Kafri et al. | |
| 5,371,794 A | 12/1994 | Diffie et al. | |
| 5,661,506 A | 8/1997 | Lazzouni et al. | |
| 5,696,828 A * | 12/1997 | Koopman, Jr. | 380/46 |
| 5,732,138 A * | 3/1998 | Noll et al. | 380/28 |
| 5,832,091 A * | 11/1998 | Tomko et al. | 380/30 |
| 5,850,443 A | 12/1998 | Oorschot et al. | |
| 5,852,434 A * | 12/1998 | Sekendur | 345/179 |
| 5,930,377 A | 7/1999 | Powell et al. | |
| 6,026,165 A | 2/2000 | Marino et al. | |
| 6,738,053 B1 * | 5/2004 | Borgstrom et al. | 345/179 |

FOREIGN PATENT DOCUMENTS

| | | |
|---|---|---|
| DE | 199 07 600 A1 | 8/2000 |
| EP | 0 984 390 A2 | 3/2000 |

(Continued)

OTHER PUBLICATIONS

Schneier, Applied Cryptography, 1996, John Wiley & Sons Inc. 2nd Edition pp. 4, 424, 175, 424, 367.*

(Continued)

*Primary Examiner*—Kimyen Vu
*Assistant Examiner*—Yogesh Paliwal
(74) *Attorney, Agent, or Firm*—Birch, Stewart, Kolasch & Birch, LLP

(57) ABSTRACT

A method and a corresponding device for generating true random numbers for use in encryption of a message for secure transmission of said message from a sending device to a receiver, or for authentication of a sent message. An optical image represented by optical data is obtained by an optical sensor and processed in order to improve the stochasticity of the optical data. The thus processed data is then used for generating random numbers which can be used as an encryption key, or for generating an encryption key, for subsequent use in an encryption algorithm for encrypting the message. The method is implemented in a digital pen (DP) to be used in an information management system.

44 Claims, 7 Drawing Sheets

FOREIGN PATENT DOCUMENTS

| | | |
|---|---|---|
| JP | 9-83512 A | 3/1997 |
| WO | WO 98/40982 A1 | 9/1998 |
| WO | WO 01/16691 A1 | 3/2001 |
| WO | WO 01/48591 A1 | 7/2001 |
| WO | WO 01/48678 A1 | 7/2001 |
| WO | WO 01/48685 A1 | 7/2001 |

OTHER PUBLICATIONS

Schneier, Applied Cryptography, 1996, John Wiley, 2$^{nd}$ Edition, pp. 425.*

Jain et al., Biometric Identification, 2000, Communications of the ACM, pp. 91-98.*

Schneier, Applied Cryptography, 1996, John Wiley & Sons, Second Edition, pp. 1, 175, 4, 424.*

Sasaki, et al. "Stream cipher based on pseudorandom number generation with optical affine transformation"; Applied Optics; vol. 39, No. 14; May 10, 2000; pp. 2340-2346.

Dymetman, Marc and Max Copperman, "Intelligent Paper", Xerox Research Centre Europe, pp. 392-406, XP-002328425.

* cited by examiner

| Record A | Record B | Record C | Record D |
|---|---|---|---|
| 1 2 3 4 | 1 2 3 4 | 1 2 3 4 | 1 2 3 4 |

Fig. 6

| Record A | Record B | Record C | Record D |
|---|---|---|---|
| 1 2 3 4 | 2 3 4 1 | 3 4 1 2 | 4 1 2 3 |

Fig. 7A

| Record A | Record B | Record C | Record D |
|---|---|---|---|
| 4 1 2 3 | 3 4 1 2 | 2 3 4 1 | 1 2 3 4 |

METHOD AND DEVICE FOR ENCRYPTING A MESSAGE

FIELD OF INVENTION

The present invention generally relates to the field of transmitting information from a sender to a receiver. More specifically, the present invention relates to a method and a device for encrypting a message for secure transmission of such a message from a sending device to a receiver. The invention further relates to a computer readable medium comprising instructions for bringing a computer to perform such a method, and a sending device and a system, respectively, comprising such a device.

BACKGROUND OF THE INVENTION

During transmission of information from a sender to a receiver, for example in a system including hand-held devices, there are basically four aspects that need to be fulfilled for obtaining a secure transmission with regards to authenticity, integrity, confidentiality and non-repudiation. However, confidentiality, i.e. that the information is kept secret during the transmission, is crucial in the field of digital communication, for example in financial transactions or in e-commerce. This aspect, as well as the other aspects, can be met by using cryptography.

When using cryptography or a network security algorithm based on cryptography, random number data is used for different reasons and play an essential role. For example, random numbers are frequently used as encryption keys or for generation of encryption keys. Furthermore, random data is by definition difficult to determine or guess.

Common methods of cryptography include symmetric encryption and asymmetric encryption. When using symmetric encryption, the same key is used for both encryption and decryption. The encryption key is used in conjunction with an encryption algorithm, and different keys will result in different outputs from the algorithm. The degree of security of the encrypted message depends on the secrecy of the key and therefore on the random number used as the key or for generating the key, not on the secrecy of the algorithm. This makes it possible to use powerful standard algorithms, such as AES (Advanced Encryption Standard), DES (Data Encryption Standard) or IDEA (International Data Encryption Standard). The degree of security also depends on the length or bit size of the key. The longer the encryption key, the more difficult it is to break the cipher.

When using asymmetric encryption, the sender and the receiver each has a private encryption key and a public encryption key. Thereby, confidentiality, authentication and non-repudiation is achieved. Commonly used asymmetric encryption algorithms include, for example, RSA (Rhivest-Shamir-Adleman) and DH (Diffie-Hellman).

It is a well-known problem that sources for true random numbers are difficult to find. Physical noise generators, such as pulse detectors of ionizing radiation events, gas discharge tubes, and leaky capacitors, are one potential source. However, such devices are of limited utility in network security applications. For example, incorporating one of these devices into a hand-held device will require a complex and possibly bulky design of the hand-held device. Furthermore, there are problems both with the degree of randomness and the precision of numbers generated by such devices.

Another approach for obtaining random numbers for cryptographic applications is to use algorithmic techniques. However, these algorithms are deterministic and therefore produce sequences of numbers that are not statistically random. Such numbers are often referred to as pseudo random numbers.

A widely used technique for pseudo random number generation is the linear congruential method. A sequence of numbers is obtained via the following equation $$X_{n+1} = (aX_n + b) \bmod c,$$

where $X_0$ is an initial number, i.e. the random seed. Usually, in a handheld device or a computer, the microseconds of the internal clock are used as random seed to initiate the algorithm.

One problem with the above-mentioned method is that once a value, the random seed, has been chosen, the subsequent numbers in the sequence follow deterministically. This means that someone having knowledge of a part of the sequence could theoretically determine subsequent elements of the sequence.

It is possible to implement more advanced random number generators that use the internal clock as random seed, for example such as the algorithm used in Bluetooth. This and similar algorithms are able to generate pseudo random numbers with improved statistical characteristics compared to the numbers generated by the linear congruential method. However, the pseudo random numbers are still of an insufficient quality in a statistical sense, i.e. when considering the degree of randomness.

Thus, there remains a problem in finding a method, that can be implemented in a system comprising hand-held devices, that provide random numbers of good quality, according to the above-mentioned criterions, for generation of encryption keys for use in encryption algorithms in order to provide a secure transmission of information between a sender and a receiver.

SUMMARY OF THE INVENTION

Thus, an object of the present invention is to provide an improved method and device for generating an encryption key and encrypting a message.

This and other objects are achieved according to the present invention by providing a method, a computer readable medium, a device, and a system having the features defined in the independent claims. Preferred embodiments are defined in the dependent claims.

According to a first aspect of the invention, there is provided a method for encrypting a message for secure transmission of said message from a sending device to a receiver. The method comprises the steps of obtaining optical data, generating an encryption key using said optical data as random seed, and encrypting said message using said encryption key in an encryption algorithm.

According to a second aspect of the invention, there is provided a device for encrypting a message for secure wireless transmission of said message from a sender to a receiver. The device comprises receiving means for receiving optical data, said optical data representing values of an optical parameter, processing means for generating an encryption key using said optical data as random seed, and encryption means for encrypting the message to be transmitted using said encryption key.

According to further aspects of the invention there are provided a computer readable medium comprising instructions for bringing a computer to perform the method according to the first aspect of the invention; a sending device arranged for obtaining a message and for sending said message to a receiver, comprising the device according to the second aspect of the invention; and an information management system comprising, inter alia, a plurality of digital pens that each comprises a device according to the second aspect of the invention.

Thus, the present invention is based on the advantageous insight of using optical data as random seed for generation of an encryption key, which in turn is used in an encryption algorithm for encrypting a message. The optical data obtained in accordance with the method of the present invention presents the requisite degree of randomness and unpredictability. In fact, the optical data can be considered as being "truly" random. Consequently, the degree of randomness is higher and the optical data used are more unpredictable as compared to the data used for random seed in the known methods described above. Thus, an improved degree of secrecy of the generated encryption key will be achieved.

Traditionally, two distinct and not necessarily compatible criteria are used to determine the quality of a sequence of random numbers, unpredictability and randomness. In a "true" random sequence, each number is statistically independent of any other number in the sequence and is therefore unpredictable. Two criteria are used to validate the randomness of a sequence of numbers. First, uniform distribution of random numbers, which means that the frequency of occurrence of each of the numbers should be approximately the same. Second, independence between random numbers, which means that no value in the sequence can be inferred from any of the others.

According to the preferred embodiment of the present invention, a surface, or a portion thereof, is scanned or read with an optical sensor, preferably a camera or a light-sensitive sensor, thereby obtaining optical data representative of characteristics the read surface. The light-sensitive sensor being, for example, a CCD sensor (Charge-Coupled Device) or a CMOS sensor (Complementary Metal-Oxide semiconductor). The obtained optical data are determined by and represent values of at least one optical parameter, which is representative of physical conditions on the portion of the surface.

Preferably, the optical data are obtained from a portion of a surface provided with a position code pattern, wherein the position code pattern includes optical readable markings. Each of said markings may be designed more or less arbitrarily. However, the design of each marking is preferably elementary, for example in the shape of round dots as shown in the detailed description below. The position code pattern is implemented using any parameter, which may be used to achieve symbols of the above-mentioned type that may be detected or sensed by a detector or sensor. The parameter may be electrical or chemical or of any other type. However, the position code pattern is preferably optically readable since this facilitates the appliance of the pattern onto the surface. Accordingly, the pattern should have the capability to reflect light, which not necessarily has to have a wavelength in the visible spectrum.

Preferably, the parameter sensed and used for the generation of the encryption key is brightness, which is a relative measure of the intensity of the energy output of a light source that is visible for an optical sensor. In the preferred embodiment of the present invention, the brightness of light that is reflected from a portion of an illuminated surface is registered. Of course, the sensed light does not necessarily have to constitute reflected light. Sensing of emitted light from luminous surfaces are also contemplated within the scope of the present invention, or any combinations of emitted and reflected light. The brightness in the sensed light may, for example, depend on variations in the surrounding illumination, the quality of the printing of the pattern, the blacking of the markings, and/or the quality of the surface, e.g. a paper surface. Biometric factors may also have an impact on the brightness, for example the inclination of the pen. These and other factors introduce a considerable degree of randomness in the optical data. Furthermore, the fact that the optical sensor in itself is a noise generator will even further enhance the degree of randomness in the optical data.

According to preferred embodiments of the invention, the optical data are processed according to a preprogrammed order or scheme and organized in data fields of a predetermined length. The data fields, in turn, are preferably organized in data records according to a predetermined scheme, e.g. in a predetermined order.

According to a specific preferred embodiment of the present invention, and in order to even further improve the stochasticity of the optical data organized in said data records, the order of the data fields within the data records are rearranged according to a cyclic reordering algorithm. According to the cyclic reordering algorithm, the order of the rearranged data fields in different data records may differ from one data record to another. Thus, a number of different reordering schemes may be used, including the case that for some data records, the order of the data fields is not altered at all. Preferably, the cyclic reordering is performed by shifting all data fields in each data record. The data fields may be shifted by a number of steps ranging from zero, i.e. no shift takes place, to a number corresponding to the number of data fields in the data record minus 1. Thus, the reordering algorithm contains information as to the number of steps each data field is shifted for a specific data record.

According to a specific embodiment of the present invention, the order of the data fields in each record included in a first set of data records are rearranged according to a first reordering algorithm. Thereby, a first set of rearranged data records is obtained. Then, the order of the data fields in each data record of a second set of data records are rearranged according to a second reordering algorithm, whereby a second set of rearranged data records is obtained. In the generation of the encryption key, the first set of rearranged data records forms key data and the second set of rearranged data records forms input data, or vice versa, of the encryption key used in the encryption algorithm. Alternatively, the key data and the input data form encryption data that can be used as material in an encryption process. For example, the material can be encrypted with the public key of the receiver, to be used as encryption key or key material, to be compressed to an encryption key, for a symmetric encryption algorithm. The advantage of the described rearranging process is that the statistical characteristics, i.e. the randomness and unpredictability, of the processed data are significantly improved.

According to a further preferred embodiment of the invention, it has surprisingly been found that a particular high degree of stochasticity have been achieved using the specific reordering algorithm explained in greater detail below. In fact, the output data of the encryption algorithm, when using the optical data as random seed and the described reordering algorithm, constitute uniformly distributed noise according to prevalent statistical testing methods.

According to an alternative preferred embodiment of the invention, the stochasticity of the obtained optical data organized in data records is improved using hash functions. According to this embodiment, a first hashing is performed on a set of a predetermined number of data records by a first algorithm, i.e. a first hash function. As understood by the person skilled in the art, hashing is an iterative process which will not be described in detail. Therefore, the term hashing output, as used hereinafter, refers to the result of all iterations included in the hashing. Thus, a first output, i.e. a first hashing output, is obtained from the first hashing. The first output is then used as an input to a second algorithm, which may be a second hash function. The output of the second algorithm, i.e. random numbers, is then, for example, used as the encryption key or for generating an encryption key in an encryption algorithm for encrypting a message. However, the second algorithm may alternatively be an iterative algorithm different from a hash function. For example, A3 or A5, which are stream ciphers and are used for symmetrical encryption, may be used.

The first hash function introduces distortion or noise in the obtained optical data used as input data. In other words, it shatter the regularities in the optical data and the correlation between data fields included in the data records. The use of a second hash function, or an alternative, preferably iterative, algorithm, on the first output further improves the statistical characteristics of the data and provides a further distortion on the first output. Thus, the statistical characteristics, i.e. the randomness and unpredictability, of the processed optical data are significantly improved using the method according to this embodiment. The improvement is such that the random numbers generated as a result of the method of this embodiment can be regarded as uniformly distributed white noise according to prevalent statistical testing methods. According to a preferred alternative of this embodiment, symmetrical encryption algorithms are used in the first and second algorithms. By using the same encryption algorithm for the algorithms, the advantages of a simplified implementation of the program code of the algorithms and a saving of memory capacity are achieved.

Furthermore, when using a symmetrical encryption algorithm, such as AES, for the actual encryption of the message, this encryption algorithm is preferably used in at least one of said algorithms as well, and preferably in both. However, it is conceivable within the scope of the present invention that other and different encryption algorithms may be used in each of said algorithms, as well as for the actual encryption of the message. Preferably, in order to even further improve the stochasticity of the encryption key, or of the random numbers used for generating the encryption key, statistical properties of the parameter are. This results in a higher degree of randomness and unpredictability. Examples of statistical properties preferably being used includes maximum, minimum and sum values of the sensed parameter. However, other statistical properties are conceivable, such as mean values, standard deviation values, etc. As realized by the person skilled in the art, the use of said calculation of statistical properties is by no means restricted to a specific embodiment of the present invention. Contrarily, the statistical properties of the optical data may be calculated and the result thereof may be used to improve the stochasticity of the optical data, and the encryption key generated therewith, regardless of the chosen method for generating the encryption key.

Furthermore, the optical data used for generating an encryption key may constitute part of the message to be encrypted and transmitted. Alternatively, the optical data do not constitute part of the message. Furthermore, the step of obtaining optical data for encrypting the message may be obtained prior to, during, or following the procedure of obtaining the message to be encrypted. As an example, the encryption of the message may take place just prior to the actual transmission thereof. Then, the encryption key, including obtaining optical data, whether the optical data are extracted from the message or not, may be generated in connection with the encryption procedure. Alternatively, the generation of the encryption key may have been performed earlier, e.g. in connection with obtaining and storing the message, and a stored encryption key is used for the encryption.

Suitably, the optical data used for generating an encryption key are stored in a storage medium prior to processing thereof. In an alternative embodiment the optical data are stored after the processing thereof.

Preferably, a symmetrical encryption algorithm is used for the actual encryption of the message. There are a number of conceivable symmetrical encryption algorithms that are suitable, for example AES, DES, or IDEA. The use of an asymmetric encryption algorithm, such as the RSA, for the actual encryption of the message is also conceivable and lie within the scope of the present invention. However, the present invention is not limited to a specific encryption algorithm.

According to preferred embodiments, the method and the device of the present invention is particularly well suited for implementation in a hand-held device, such as a digital pen. Such a digital pen would then comprise an optical sensor for obtaining a message to be transmitted, for instance from a surface provided with a position code pattern as described above. Preferably, the digital pen also comprises illumination means for illuminating a surface to be read by the optical sensor. The illumination means and the optical sensor may be restricted to a limited wavelength range, such that the optical sensor primarily detects reflected light that are provided by the illumination means. Preferably, the optical sensor is also used for obtaining the optical data used for generating an encryption key. Thereby, no additional sensor or random number generator is required within the limited interior of the digital pen.

Furthermore, the digital pen comprises a processor or processing means for performing the steps of the present invention, as well as all the steps required for obtaining, encrypting and transmitting a message. Furthermore, the digital pen also comprises, inter alia, suitable storing means for storing data, power supply means, e.g. a battery, as well as transmission means for transmitting the message to a receiver.

According to a further embodiment of the invention, a pressure sensor is provided for obtaining pressure data. Since the pressure data relates to biometric factors, such as movements of the hand, the degree of randomness of the pressure data is high. The pressure data can then be used in combination with the optical data as random number data or random seed, in the generation of an encryption key, in order to enhance the degree of randomness in the random seed.

Also, according to yet another embodiment of the invention, time data are obtained and used in combination with the optical data as random seed in order to enhance the stochasticity of the random seed. Although time data is deterministic by nature, the degree of randomness of the combined data will not be decreased. The time data are preferably provided by the internal clock of the processing means. The thus obtained random seed may be subsequently used in the generation of the encryption key in the manner as described above.

As understood be the person skilled in the art, there are other related areas where the random numbers generated from optical data in accordance with the present invention may be utilized. One such area is authentication of a sent or received message.

Another area is key transport from a sender to a receiver. Then, the random numbers are encrypted with a public key of the receiver and are used as an encryption key or key data, to be subsequently compressed to an encryption key, for a symmetric encryption algorithm.

The random numbers can also be used to generate prime numbers for RSA or DH keys.

As realized by the person skilled in the art, the method and the device of the present invention, as well as the preferred embodiments thereof, are suitable to realize as a computer program or a computer readable medium, preferably within the contents of a digital pen.

Further objects and advantages of the present invention will be discussed below by means of exemplifying embodiments. dr

BRIEF DESCRIPTION OF THE DRAWINGS

Preferred embodiments of the invention will now be described in greater detail with reference to the accompanying drawings, in which

FIG. 6 schematically shows the order of data fields within a key data block and an input data block prior to a cyclic reordering procedure according to an embodiment of the present invention;

FIGS. 7A and 7B schematically show the order of data fields within the key data block and input data block, respectively, after said cyclic reordering procedure.

DESCRIPTION OF PREFERRED EMBODIMENTS

In the following, an information management system in which the present invention can be implemented is described scribed with reference to FIG. 1. After this general presentation of the system structure, a product provided with a position code pattern will be described with reference to FIG. 2. Then, with reference to FIG. 3, a sending device, in which the present inventive method and device can be implemented, designed for reading and obtaining optical data from the position code of FIG. 2 is shown.

Figure 1:
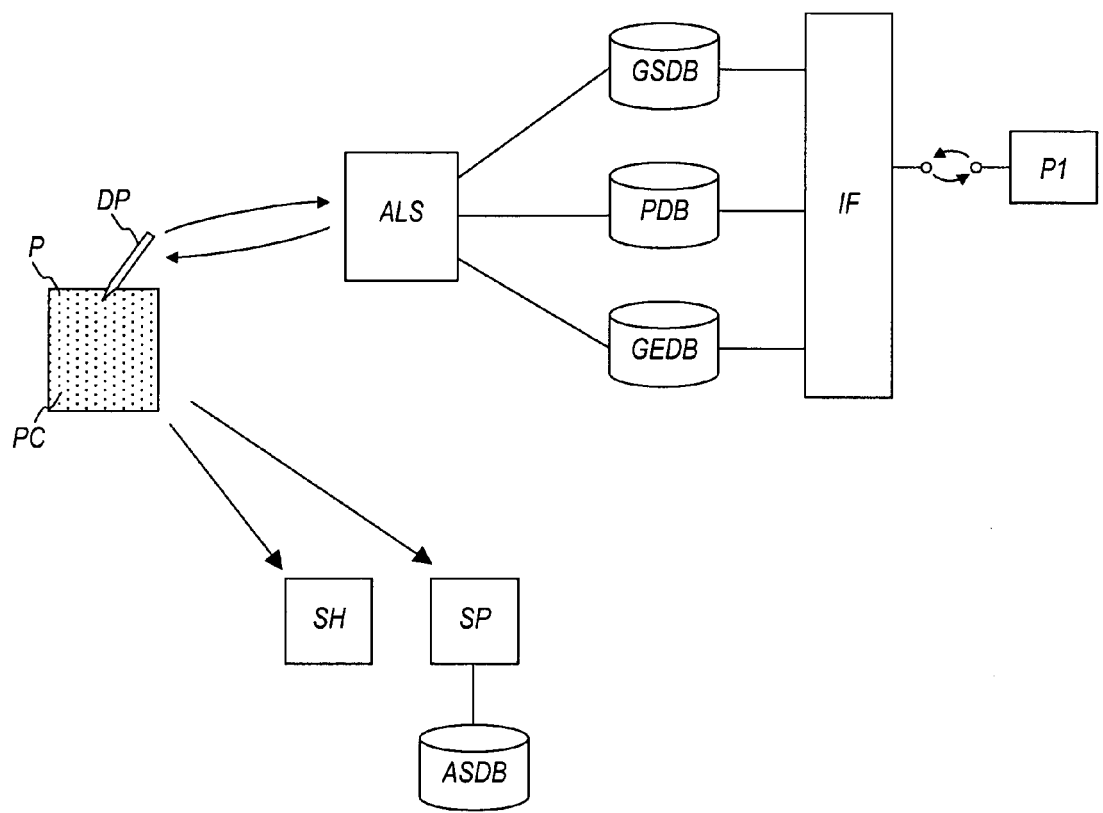
FIG. 1 shows an embodiment of an information management system according to the present invention.
Figure 2:
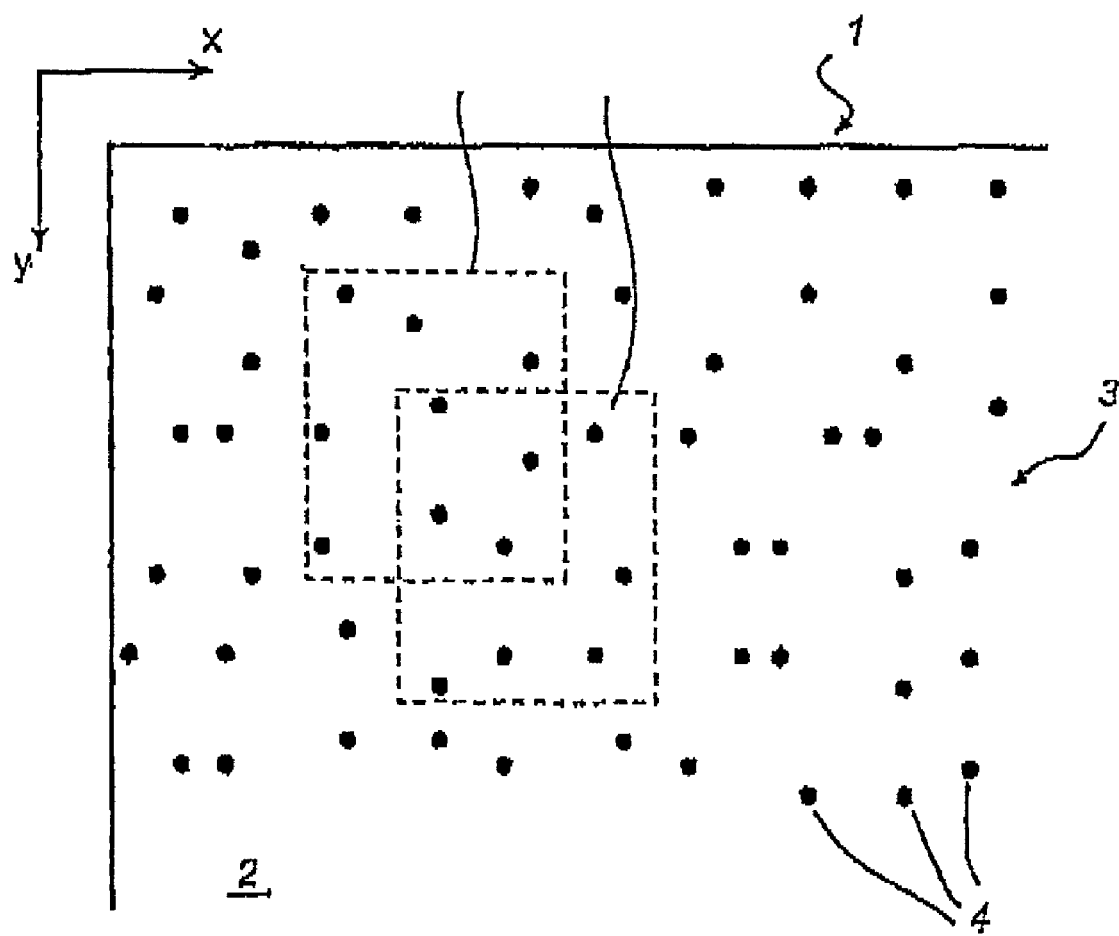
FIG. 2 schematically shows an embodiment of a product provided with a position-code pattern.

With reference first to FIG. 1, an information management system in which a position-code product and a sending device, such as a digital pen, can be integrated is shown. There are many inter-reliant actors involved in the system of FIG. 1: companies manufacturing the digital pens ("pen manufactures"), companies manufacturing the position-coded products ("paper manufactures"), companies providing different services by means of service handler units ("service handlers"), a company administrating the position-code based on the virtual space database ("pattern administrator"), operators providing the communication links between the digital pens and the different units ("network operators"), and a multitude of users of digital pens ("pen owners").

The system of FIG. 1 includes a multitude of sending devices or digital pens DP and position code products P (only one of which being shown in FIG. 1), a look-up unit ALS, and a plurality of service handler units SH (only one of which is shown in FIG. 1). It should be noted that the information can be transmitted in any suitable way from the digital pen DP to the look-up unit ALS and the service handler unit SH. In one embodiment, wireless transmission of information is effected from the digital pen DP to a network connection unit, which in turn transmits the information to the look-up unit ALS and service handler unit SH, respectively. The network connection unit can be an integral part of the digital pen DP. Alternatively, the network connection unit can be a mobile phone or a computer or any other suitable unit with an interface to a computer network such as the Internet or a LAN. The look-up unit ALS is connected to a virtual space database GSDB which includes data on the functionality of every position coded by the position code PC and the actor associated with each such position. The look-up unit ALS is also connected to a pen database PDB, which includes data on all digital pens in the system, such as the unique pen identifier of each pen and all settings or properties that are associated with each pen. The pen database PDB also includes data relating to the manufacturer of each pen. In addition thereto, the look-up unit ALS is connected to an event database GEDB, which includes data on the transactions taking place in the look-up unit ALS, i.e. the address requests made by the pens in the system and the address responses returned to the pens, as well as any errors occurring in the process. As an alternative to individual databases as shown in FIG. 1, the look-up unit ALS could be connected to one all-embracing database.

The system also includes one or more networks in which network operators handle the communication between the digital pens DP and the look-up unit ALS, and between the digital pens DP and the service handler unit SH. To this end, the owner of a pen has opened a subscription at one of the network operators. This network operator could also act as a service handler in the system, for example by means of a server unit SP providing communication services that allows the pen owner to send electronic messages, for example e-mail, SMS or fax, based on information written on the position-coded products P by means of the digital pen DP. The server unit SP of the network operator could also provide for network storage of information generated in the system, for example entries in an position-coded calendar or notebook. When acting as a service handler, the network operator maintains an application database ASDB which contains data on user-specific settings for different applications, for example a signature or electronic business card to be attached to e-mail messages, where and how to store sent messages, etc.

In the embodiment of FIG. 1, the system includes Internet portals hosted by one or more web servers which are interfaced with the databases of the system, one portal of which P1 being shown in FIG. 1. The portal P1 is a so-called Partner Portal, i.e. a portal which allows pen manufactures, paper manufactures, service handlers and network operators to access selected portions of the databases of the system, via an interface unit IF. An example of another portal is a so-called Pen Owner Portal, i.e. a portal which allows for the pen owners to access selected portions of the databases of the system. In an alternative embodiment, the functionalities of the two portals are merged into one common portal.

In the communication between the different participants illustrated in FIG. 1, it is desirable that the information is sent in a secure way, i.e. by using encryption and digital signatures. If the digital pen DP sends confidential information to the service handler unit SH, the digital pen DP encrypts the information and the service handler unit SH will, in order to decipher the information, decrypt it. The digital pen DP can use either symmetric encryption or asymmetric encryption.

In FIG. 2, a portion of a product, such as the position-coded product used in the system of FIG. 1, in the form of a paper 1, provided with, on its surface 2, an optical readable position code pattern 3 which enables a determination of the position. The position code pattern includes markings 4, which are methodically arranged over the surface 2. The Applicant proposes in the international patent application WO 01/16691, which is incorporated herein by reference, the use of a product having a writing surface which is provided with such a position code. The position code, which codes a plurality of positions on the surface, enables electronic recording of information that is being written on the writing surface, by means of a digital pen which detects the position code. The position code is capable of coding coordinates of a large number of positions, much larger than the number of required positions on the product. Thus, the position code can be seen as forming a virtual space which is defined by all positions that the position code is capable of coding, whereby different positions in the virtual space can be dedicated for different functions and/or actors. It should be noted that the position code pattern shown in FIG. 2 is, for the sake of clarity, greatly enlarged.

Figure 3:
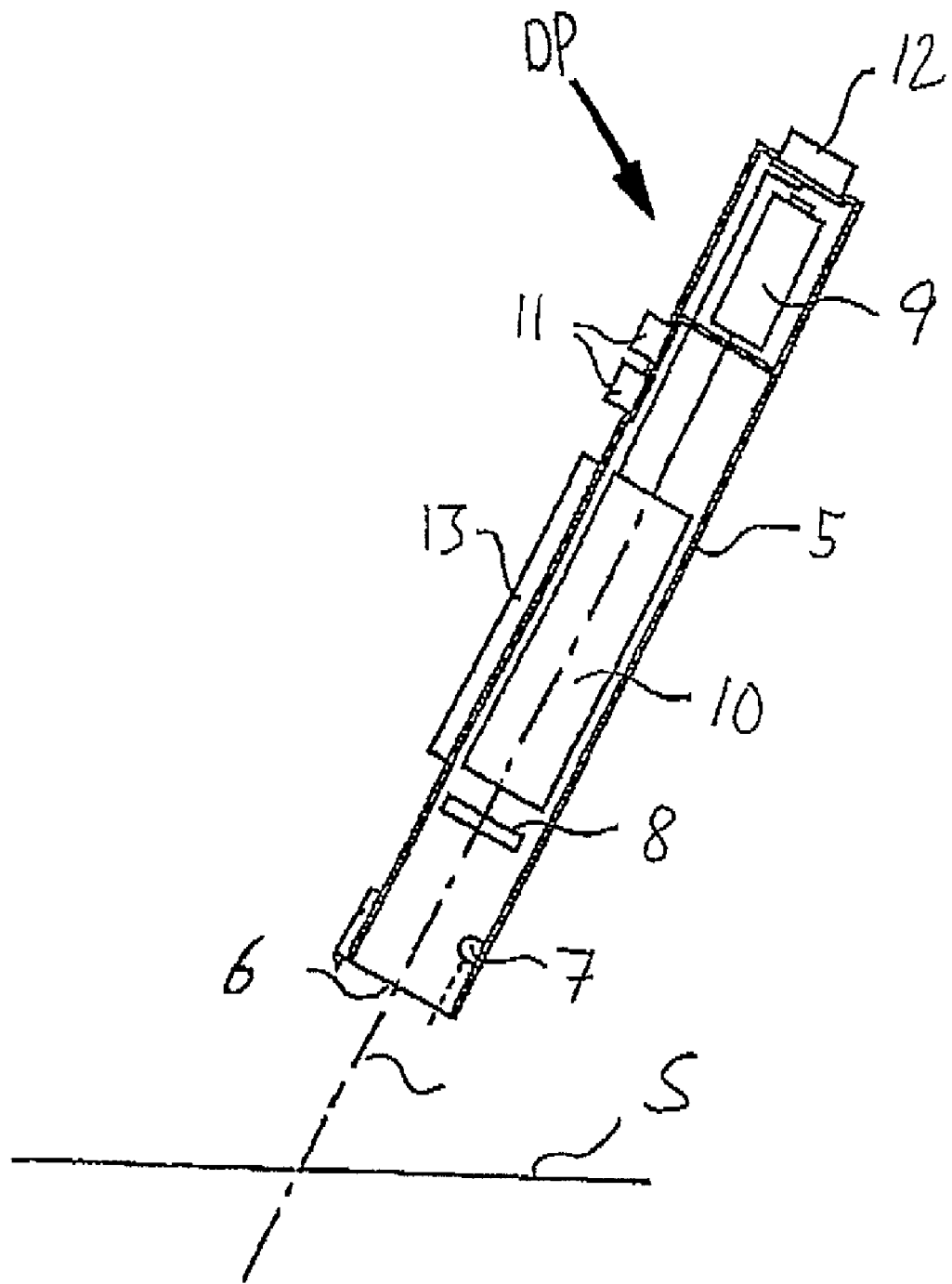
FIG. 3 schematically shows an embodiment of a sending device according to the present invention.

FIG. 3 shows a schematic representation of an embodiment of a sending device designed for reading, for example, a position code pattern of FIG. 2. According to the preferred embodiments of the present invention, the device is a digital pen. The pen DP comprises a housing 5, shaped in a pen-like form. An opening 6 is provided at one end portion of the housing 5. The opening is intended to rest against, or to be held at a short distance from, the surface S from which information is to be obtained.

Within the housing 5 an optical unit, an electronic unit, and a current supply unit are incorporated. According to further embodiments of the digital pen, a pressure sensor unit may also be comprised within the housing 5, which will be discussed below.

The optical unit comprises a diode 7, arranged to illuminate the surface provided with the position code, and a light-sensitive sensor 8, for example a CCD sensor (Charge-Coupled Device) or a CMOS sensor (Complementary Metal-Oxide semiconductor), arranged to register two-dimensional images. The current supply unit is in this embodiment a battery 9, arranged in a separate container.

The electronic unit 10 comprises a processor device including image-processing means, encryption means and a processor programmed to read images from the sensor 8 and to perform determination of the position and decoding of information on the basis of the images. Furthermore, the processor is programmed to perform computations in order to, for example from an image received from the sensor, calculate properties of the optical data obtained from the image. The data resulting from these computations can be used as input data for other computations or algorithms, such as encryption algorithms. In this embodiment, the AES and RSA algorithms are implemented in the processor device.

Also, the electronic unit 10 comprises a memory or data storage that is arranged, for example, to store data received from the processor or the sensor, as well as program instructions for the processor device.

Furthermore, the pen may comprise a keypad 11, which enables activation and controlling of the pen. A transceiver 12 for wireless communication, by means of IR-light or radio waves, with other participants of the system of FIG. 1 is also included. Additionally, a display 13 for showing, for example, registered information can be included. The keypad, the transceiver, and the display are in communication with and controlled by the electronic unit 10.

It should be noted that the illustration of FIG. 3 is schematical and that the actual configuration of the parts comprised within the pen may differ from the configuration shown without departing from the scope of the present invention.

In the above-mentioned embodiment, the position-code pattern is an optical readable pattern and, thus, the sensor is an optical sensor. The position code pattern can be based on another parameter than an optical parameter as mentioned above. In that case, the sensor must, of course, be of such a type that is capable of reading the parameter in question.

The combination of a digital pen and a position-coded product can be used as an input device to a computer, a PDA, a mobile phone, or the like.

For example, text and sketches written on a position-coded notepad can be transferred via the pen to a computer. Additionally, the combination of a pen and a position-coded product allows for global communication, directly from the product via the pen, by the position code on the product being dedicated for such communication. For example, the information registered by the pen can be transformed into a fax message, an e-mail or an SMS, and can then be sent from the pen to a recipient. Further, the combination of a pen and a position-coded product can be used in e-commerce. For example, the digital pen can be used to order an item from a position-coded advertisement in a magazine, by the position code in the advertisement being dedicated for such a service.

The above concept has been implemented in a system or infrastructure, which is shown in FIG. 1 and which is further disclosed in Applicant's international patent applications PCT/SE00/02640, PCT/SE00/02641, and PCT/SE00/02659, which are incorporated herein by reference.

Figure 4:
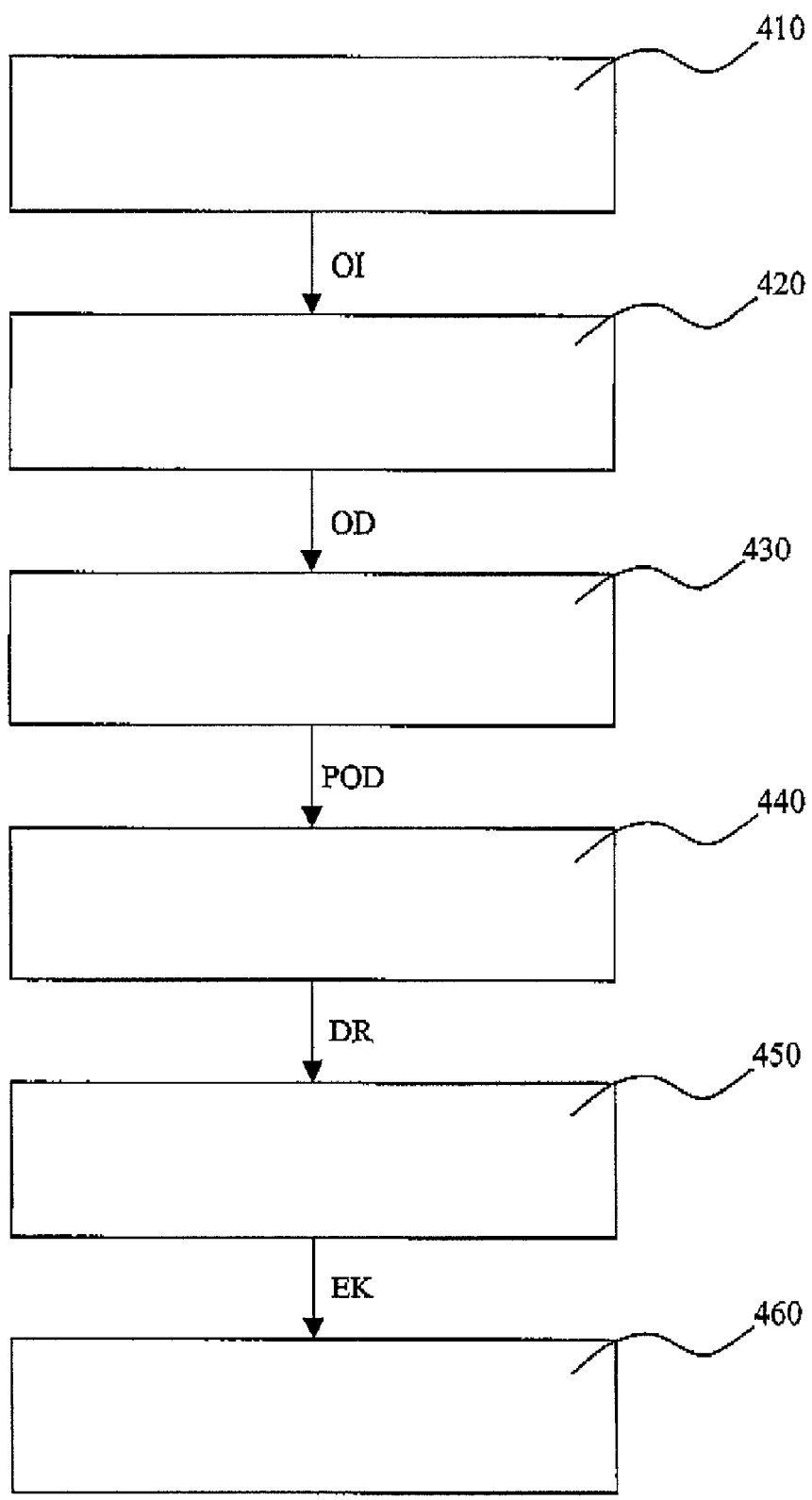
FIG. 4 shows a flow diagram illustrating an embodiment of a method according to the present invention for encrypting a message using optical data.

There will now be presented in the form of a flow diagram, with reference to FIG. 4, the inventive method for encryption of a message based on information written on the position coded products of FIG. 2 by means of the sending device of FIG. 3, and to thereby provide a secure transmission of said message from a sending device to a receiver, for example in the form of an e-mail, an SMS, or a fax. Furthermore, the position coded product and the sending device is preferably incorporated in a system as presented in FIG. 1.

Beginning at step 410, a patterned surface is read or scanned by the sensor 8, whereby an optical image OI is obtained. The image OI is then stored as a mapping of the pattern in an image storing medium. The optical image OI or the optical data representing the image includes a predetermined number of pixels. Each optical image OI is, in turn, divided into a predetermined number of sub-images or image elements, wherein each image element includes a predetermined number of pixels. The size and number of these pixel representations, i.e. the resolution, is adjustable.

According to one exemplifying embodiment, each optical image includes 96×96 pixels. Furthermore, the 96×96 pixels are divided in a matrix constituent of 16×16 image elements, wherein each image element consequently consists of 6×6 pixels. Of course, there are any number of conceivable pixel configurations of an optical image that can be used without departing from the scope of the present invention.

At step 420, decoding of information comprised in the data of the optical image is performed. In the preferred embodiment, the resulting optical data OD comprise information of the brightness on the portion of the surface that has been read. Factors having an influence on the sensed brightness have already been discussed above. The brightness is represented by discrete values. In the preferred embodiment of the present invention, a white surface corresponds to a value of 255 and a black surface, e.g. a black marking, corresponds to a value of 0. To enhance the dynamics of the optical data, it is preferred that each image element, representing a portion of the surface, includes data of at least one marking and at least a portion of a surface surrounding the markings.

However, any of the input values from the digital pen's sensors, such as pen pressure, coordinates, time, or the like, can be used as parameters for key generation. These parameters are then used in combination with the optical data OD or in combination with computer random seeds.

At step 430, the optical data OD produced by the sensor are processed to calculate specific statistical properties of the optical data. According to the most preferred embodiments, a maximum value, a minimum value and a sum value of the intensity or brightness of a number of pixels are calculated and used in the continued process as optical data. The thus calculated statistical values are hereinafter referred to as processed optical data POD. This calculation is performed on each image element, i.e. on the optical data OD represented in each image element, respectively. There are, of course, other preferably statistical properties that may be calculated, such as a mean value, or a standard deviation value.

Thereafter, at step 440, the resulting sequence of processed optical data POD is organized in bit-groups or data fields, According to the most preferred embodiment of the present invention, each image element is represented by one data record DR and each data record DR consists of four data fields. The first two data fields contain the calculated sum value, the third contains the calculated minimum value, and the fourth contains the calculated maximum value. Thus, a sequence of data records DR is produced from one optical image, each data record corresponding to one image element of the image. When the data records DR are produced, they are optionally stored in a cyclic register, prior to the use as random number data, and are arranged in the processor device to be accessed by the processor when required, for example at the transmission of a message.

Figure 5:
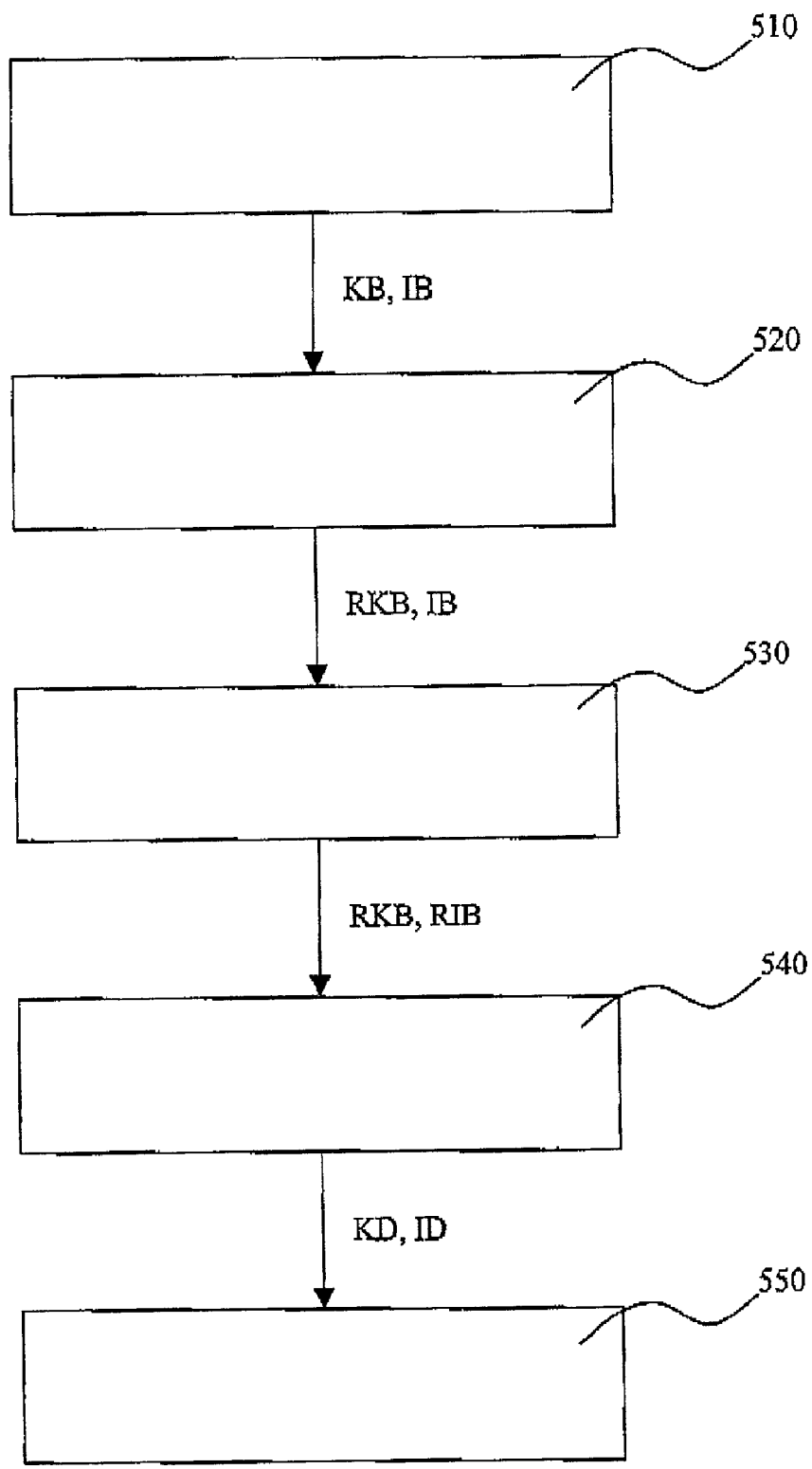
FIG. 5 shows a flow diagram illustrating an algorithm of a first embodiment for increasing randomness in optical data used for generating an encryption key.
Figure 8:
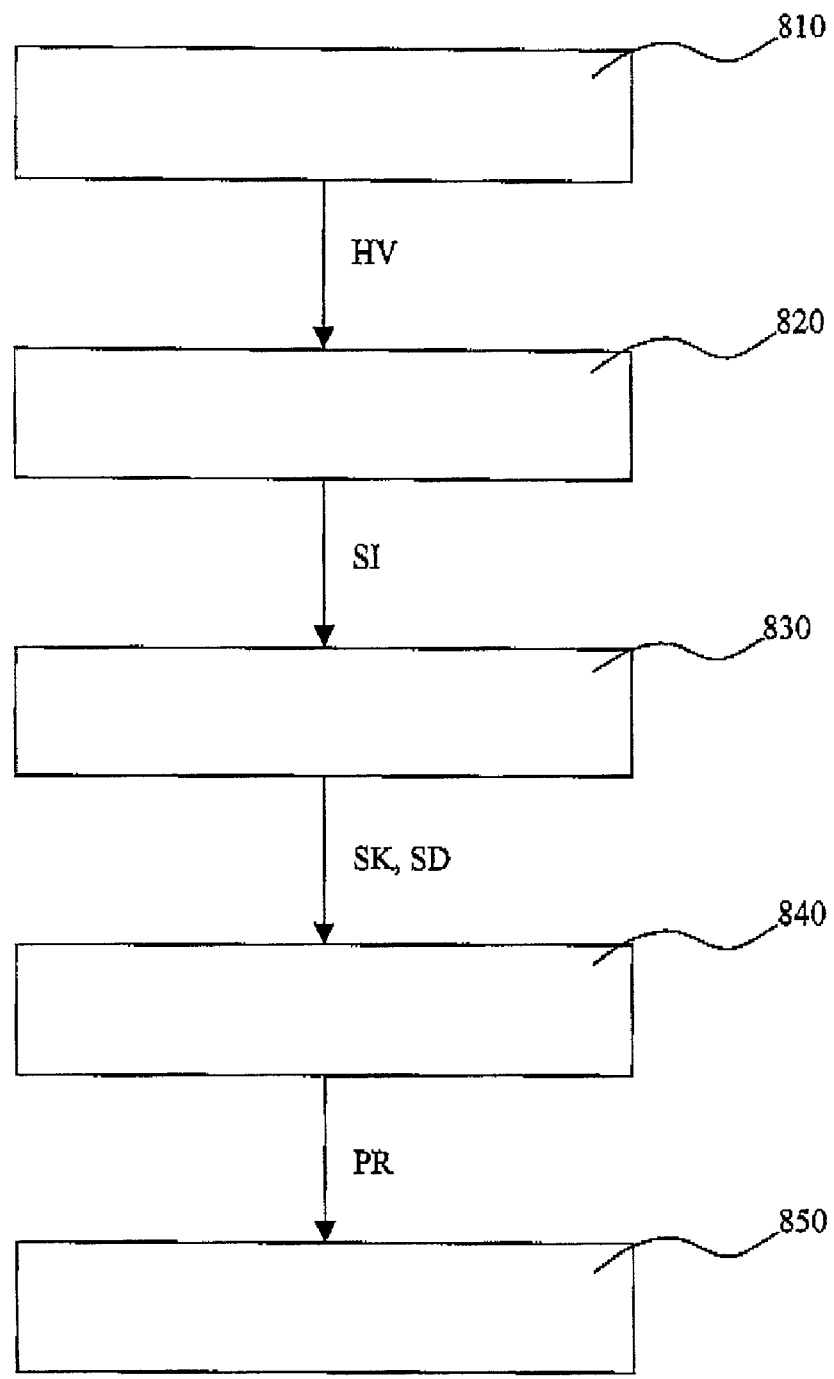
FIG. 8 shows a flow diagram illustrating an algorithm of a second embodiment for increasing the randomness in the input data used for generating an encryption key.

Then, at step 450, the sequence of data records DR is processed in an algorithm in order to increase the stochasticity of the processed optical data in the data records. This is due to the fact that the processed optical data POD are not one hundred percent random in a statistical sense. Thus, it is desirable to perform additional processing in order to improve the statistical characteristics of the optical data, i.e. increase the randomness or stochasticity of the processed optical data, before the processed optical data is used as a random seed. FIGS. 5 and 8 show two different algorithms of two alternative embodiments of the present invention for increasing the randomness of the processed optical data. These algorithms will be described in greater detail below.

Finally, at step 460, the processed optical data are used as an encryption key EK in an encryption algorithm and encryption of a message obtained from the position-coded surface using the digital pen is performed.

According to an alternative embodiment, the processed optical data is, at step 460, used for authentication of a sent message. Then, the processed optical data are used as random number data, which is encrypted by means of an encryption key, for example a private key of the digital pen, and the encrypted random number data is used for authentication of said sent message.

Encryption algorithms, such as the AES encryption algorithm, uses block encryption. A block cipher, i.e. an encryption algorithm using block encryption, is a method of encryption text (to produce ciphertext) in which an encryption key and algorithm are applied to a block of data at once as a group rather than to one bit at a time. The main alternative method, used much less frequently, is called the stream cipher.

There is a cryptologic difficulty when the text to be encrypted contains static data, that do not change from on text to the other. If different encryption keys are used to encrypt the text that contains static data, an attacker could draw conclusions regarding the key if the position of the static data is known by the attacker. In order to prevent this, it is common to apply the cipher text from the previous encrypted block to the next block in the sequence. This way of encrypting in block ciphers are often referred to as CBC (Cipher Block Chaining) encryption. The encryption of the block including the static data is then dependent of all previous text blocks, which makes it more or less impossible to draw conclusions regarding the key from the encryption of the static data. To ensure this, an initiation vector derived from a random generator is combined with the text in the first block. Consequently, and according to preferred embodiments of the present invention, the processed optical data are used for forming both the encryption key, i.e. the key data block, and the initiation vector, i.e. the input data block.

With reference now to FIG. 5, there is shown a flow diagram of the method according to a first preferred algorithm in accordance with the present invention for increasing the randomness or stochasticity of the processed optical data and to produce random numbers. It should be noted that the following description with reference to FIGS. 5, 6, 7A, and 7B corresponds to step 450 of FIG. 4.

First, at step 510, the sequence of data records, obtained at step 440 of FIG. 4, is organized into data blocks, wherein each data block is determined or labeled as either a key data block KB or an input data block IB, in accordance with the description above. According to the most preferred embodiment of the present invention, four subsequent data records are organized in a single data block. Furthermore, every second data block is a key data block KB, and the intermediate data blocks are input data blocks IB.

Then, at step 520, the key data blocks KB are processed according to a first mathematical algorithm, and at step 530 the input data blocks IB are processed according to a second mathematical algorithm. The mathematical algorithms define a cyclic reordering or shifting procedure of the data fields included in the key data block KB and the input data block IB, respectively.

With particular reference to FIG. 6, the order of the data fields within a key data block KB or an input data block IB are shown prior to the shifting procedure. The records are shown schematically as boxes divided into four elements, each element representing a data field. In the most preferred embodiment, the fields indicated with 1 and 2 include the sum of brightness, the fields indicated with 3 the minimum, and the field indicated with 4 the maximum. The cyclic shifting scheme of the data fields included in the key data block KB is shown below in table 1.

TABLE 1

| Data record | Steps |
| --- | --- |
| A | 0 |
| B | 3 |
| C | 2 |
| D | 1 |

In FIG. 7A, the order of the data fields within the key data block after the cyclic shifting has been performed is shown. The data fields of the first data record, record A, retain their positions, the data fields within the second record, record B, are shifted three positions to the right, the fields within the third record, record C, are shifted two positions to the right, and the fields within the fourth record, record D, are shifted one position to the right. The data block output as a result of the reordering algorithm for a key data block is referred to as reordered key data block, RKB.

In table 2, the cyclic shifting scheme of the data fields included in the input data block IB is shown.

TABLE 2

| Data record | Steps |
|---|---|
| A | 1 |
| B | 2 |
| C | 3 |
| D | 0 |

In FIG. 7B, there is shown the order of the data fields within the input data block after the cyclic shifting, to the right, has been performed. The data fields within the first data record, record A, are shifted one position, the data fields within the second data record, record B, are shifted two positions, the data fields within the third data record, record C, are shifted three positions, and the data fields within the fourth data record, record D, retain their positions. The data block output as a result of the reordering algorithm for an input data block is referred to as reordered input data block, RIB.

It should be noted that a wide variety of shifting algorithms may be used within the scope of the present invention to obtain reordered or rearranged key and input data blocks. However, it has surprisingly been found that the above described reordering of the data fields within the data records included in the key data block and the input data block provides a particular and considerable improvement of the desired statistical properties for the output data of an ensuing encryption, when using the result of the reordering procedure as key data and input data for the encryption. In other words, the randomness and stochasticity of the output data is increased and the predictability is decreased. In fact, according to statistical testing procedures recognized within the art, the output data of the encryption algorithm, i.e. the encrypted message, can be regarded as uniformly distributed white noise. This unexpected effect is due to the fact that the correlation between the processed optical data included in the data fields within a data record, which in turn is transmitted to the output data of the encryption algorithm, is shattered by the above-mentioned reordering procedure.

Then, at step 540, the data in the thus reordered key and input data blocks are used as the encryption key, key data KD, and the initiation vector, input data ID, respectively, for the encryption algorithm.

Finally, at step 550, the method is returned to the procedure shown in FIG. 4 at step 460, where the actual encryption of the message is performed using, in this preferred embodiment, the AES encryption algorithm, However, other encryption algorithms are of course contemplated within the scope of the present invention.

Below, a second alternative preferred embodiment of an algorithm for improving the statistical characteristics of the processed optical data will be described, with particular reference to FIG. 8.

The algorithm can be regarded as having two parts. In the first part, referred to as the seed update, a random seed is calculated based on the processed optical data. In the second part, referred to as the random number calculation, the thus calculated random seed is used as input data for calculation of the random numbers to be used in the encryption algorithm.

Data blocks that include a subset of the sequence of data records containing the processed optical data form the input data in the seed update part. The data records comprise data fields, preferably organized as is described above in relation to the first preferred embodiment. Thus, each data record includes four data fields, the first two including the sum value, the third the minimum value, and the fourth the maximum value, see FIG. 6.

At step 810, each data block is processed in a first hash function, which in this embodiment is an encryption algorithm, in order to increase the randomness of the data records containing the processed optical data. The first hash function is, in this embodiment, a symmetrical encryption algorithm. The data records containing the processed optical data are used as the encryption key, and an arbitrarily chosen vector is used as the initiation vector. However, it is preferred that the number of ones and zeros are substantially equal and appropriately distributed throughout the initiation vector. This can be achieved by using the previous seed as the initiation vector for the hashing algorithm, which will remove the risk of patterns that may be produced due to frequent seed updates with substantially similar input data, and will improve the quality of the random seed.

Then, at step 820, an iterative process concatenates each hashing output or hash value, HV, and thereby forms hashing output data blocks. This is due to the fact that a hashing process normally results in an output having a data size that is less, or much less, than the data size of the input data. The number of iterations is dependent on the desired size of the output data.

The output data blocks are then divided into key data blocks and seed data blocks at step 830. The key data blocks and seed data blocks are used as input data in the random number calculation part. This can mathematically be written as

| Input data: | optical data | $= SU_{2*m-1} \ldots SU_1 SU_0$ |
|---|---|---|
| Calculation: | $SI_x$ | $= Hash_n(SI_x, SU_x)$ |
| Output data: | seed input | $= SI_{2*m-1} \ldots SI_1 SI_0$ |
| | | $= SK_{m-1} \ldots SK_1 SK_0 SD_{m-1} \ldots SD_1 SD_0$ |
| | key data | $= SK_{m-1} \ldots SK_1 SK_0$ |
| | seed data | $= SD_{m-1} \ldots SD_1 SD_0$ | where $=Y/n$, Y is the bit-length of the random number to be generated in the second step, and n is the bit-length of the output data of the hashing algorithm, Hash. Furthermore, $SU_x$ is input data block x, $SI_x$ is output data block x, $SK_x$ is key data block x and $SD_x$ seed data block x. In this embodiment, the hashing algorithm is performed using a symmetric encryption algorithm, AES. As realized by the person skilled in the art, there are a significant number of conceivable algorithms that can be used to obtain an increased randomness and that can be implemented instead of the AES algorithm. The seed update can be performed with a full update of the seed, i,e. with all data blocks included in SI, or with one data block, $SI_x$. This is dependent on the requirements of the random number calculation algorithm in part two and the computer power at hand.

Then, at step 840, in the random number calculation part, the key data blocks and seed data blocks are used as input data in a second algorithm, which in this embodiment utilizes a symmetrical encryption algorithm, for example AES. The algorithm performed at step 840 is an iterative algorithm. As mentioned above, there are a number of alternative encryption algorithms that can be used in said second algorithm instead of AES, for example IDEA or DES. Alternatively, A3 or A5, which are stream ciphers and are used for symmetrical encryption, may be used. A counter, seed count, is also included. It counts the number of times the random number calculation was used since the input data were updated in the seed update. Mathematically, the random number calculation can be written as

| | | |
|---|---|---|
| Input data: | key data | $= SK_{m-1} \ldots SK_1 SK_0$ |
| | seed data | $= SD_{m-1} \ldots SD_1 SD_0$ |
| | seed count | |
| Calculation | For x from 0 to (m – 1) | |
| | 1.1 $PR_x$ | $= \text{Encrypt}(\text{key} = SK_x, \text{input} = SD_x)$ |
| | 1.2 $SK_{(x+2) \bmod m}$ | $= SK_{(x+2) \bmod m} \text{ xor } PR_x$ |
| | 1.3 $SD_{(x+1) \bmod m}$ | $= SD_{(x+1) \bmod m} \text{ xor } PR_x$ |
| | seed count | $= \text{seed count} + 1$ |
| Output data | random number | $= PR_{m-1} \ldots PR_1 PR_0$ |
| | key data | $= SK_{m-1} \ldots SK_1 SK_0$ |
| | seed data | $= SD_{m-1} \ldots SD_1 SD_0$ |
| | seed count | | where $PR_x$ is a random number data block x, xor is an XOR operation, mod is a modulus operation, and encrypt is a symmetric encryption algorithm. Also, a block transformation is performed in the calculation step. This transformation further increases the randomness of the random numbers.

The transformation of steps 1.2 and 1.3 could be made in a number of other ways, but the described method ensures that all changes in a block is transformed through out most of the random seed, and thereby ensures a high quality random seed for the following calculation.

According to an alternative embodiment, the second algorithm is a hash function, preferably using the same symmetrical encryption algorithm as in the second algorithm described above.

Finally, at step 850, the method is returned to the procedure shown in FIG. 4 at step 460, where the actual encryption of the message is performed using, in this preferred embodiment, the AES encryption algorithm, where the random number data $PR_x$ obtained through the above method are used as the encryption key at step 460 of FIG. 4.

Alternatively, an encryption of the random number data $PR_x$ is performed, for example by the use of an asymmetric encryption algorithm. Then, the encrypted random number data is sent to the receiver of the encrypted message. The receiver performs a hashing on the encrypted random number data and uses the resulting hash value as a private encryption key, which then is used in an asymmetric encryption algorithm for decryption of the received message.

Although specific embodiments have been shown and described herein for purposes of illustration and exemplification, it is understood by those of ordinary skill in the art that the specific embodiments shown and described may be substituted for a wide variety of alternative and/or equivalent implementations without departing from the scope of the present invention. Those of ordinary skill in the art will readily appreciate that the present invention could be implemented in a wide variety of embodiments, including various hardware and software implementations, or combinations thereof. This application is intended to cover any adaptations or variations of the preferred embodiments discussed herein. Consequently, the present invention is defined by the wordings of the appended claims and equivalents thereof.

The invention claimed is:

1. A method in a digital pen for encrypting a message for secure transmission of said message from the digital pen to a receiver, comprising:
   obtaining optical data by imaging a portion of a surface provided with a position code pattern using an optical sensor of said digital pen, said optical data representing values of an optical parameter of desired variability read by said optical sensor,
   obtaining the message by registering images of the surface provided with the position code pattern using the optical sensor of the digital pen, and determining at least one position from the images,
   generating an encryption key using said optical data as a seed, wherein repeated imaging of the same pattern results in random seeds, and
   encrypting said message using said encryption key in an encryption algorithm.

2. The method according to claim 1, wherein said optical parameter is brightness sensed by said optical sensor.

3. The method according to claim 1, wherein the position code pattern including optical readable markings, and wherein said optical parameter is representative of said portion.

4. The method according to claim 1, wherein the encryption key comprises key data and input data, the method further comprising:
   using a first subset of said optical data for generating said key data, and
   using a second subset of said optical data for generating said input data.

5. The method according to claim 1, wherein said encryption algorithm for encrypting said message is a symmetric encryption algorithm.

6. The method according to claim 1, further comprising the steps of
   obtaining pressure data using a pressure sensor, wherein the step of generating an encryption key comprises:
   generating an encryption key using said pressure data in combination with said optical data as random seed.

7. The method according to claim 1, further comprising:
   obtaining time data, wherein the step of generating an encryption key comprises:
   generating an encryption key using said time data in combination with said optical data as random seed.

8. The method according to claim 1, wherein the step of generating an encryption key comprises:
   processing said optical data according to a predetermined scheme,
   organizing said processed optical data in data fields, wherein each data field has a predetermined size, and
   organizing said data fields in a predetermined order in data records.

9. The method according to claim 8, wherein the step of processing said optical data comprises:
   calculating statistical properties of sets of said optical parameter values represented by said optical data, whereby said statistical properties constitute said processed optical data.

10. The method according to claim 9, wherein said statistical properties comprise a maximum value, a minimum value and a sum value of said set of optical parameter values, and wherein the step of processing said optical data comprises:
    organizing said maximum value in at least one maximum data field, said minimum value in at least one minimum data field, and said sum value in at least one sum data field, and
    organizing said maximum, minimum, and sum data fields in a data record according to said predetermined order.

11. The method according to claim 9, wherein the step of generating an encryption key comprises:
    rearranging the order of said data fields within at least one data record of a first series of data records according to a first reordering algorithm, thereby obtaining a first series of rearranged data records, and rearranging the order of said data fields within at least one data record of a second series of data records according to a second reordering algorithm, thereby obtaining a second series of rearranged data records, wherein an encryption key comprises key data and input data, and wherein the step of generating an encryption key comprises:

using said first series of rearranged data records as said key data, and using said second series of rearranged data records as said input data.

12. The method according to claim 9, wherein the step of generating an encryption key comprises:

processing a set of a predetermined number of said data records in a first step using a first hash function, thereby obtaining a first output, processing said first output in a second step using an iterative algorithm, thereby obtaining a second output, and using said second output as said encryption key or for generating said encryption key.

13. The method according to claim 8, wherein the step of generating an encryption key comprises:

rearranging the order of said data fields within at least one data record of a first series of data records according to a first reordering algorithm, thereby obtaining a first series of rearranged data records, and rearranging the order of said data fields within at least one data record of a second series of data records according to a second reordering algorithm, thereby obtaining a second series of rearranged data records.

14. The method according to claim 13, wherein an encryption key comprises key data and input data, and wherein the step of generating an encryption key Comprises:

using said first series of rearranged data records as said key data, and using said second series of rearranged data records as said input data.

15. The method according to claim 8, wherein the step of generating an encryption key comprises:

processing a set of a predetermined number of said data records in a first step using a first hash function, thereby obtaining a first output, processing said first output in a second step using an iterative algorithm, thereby obtaining a second output, and using said second output as said encryption key or for generating said encryption key.

16. The method according to claim 15, wherein, in said second step, said first output is processed using a second hash function.

17. The method according to claim 15, wherein in said first and second steps, a first and a second symmetrical encryption algorithm, respectively, is used.

18. The method according to claim 17, wherein one symmetrical encryption algorithm is used both as said first and as said second symmetrical encryption algorithms.

19. The method according to claim 18, wherein one symmetrical encryption algorithm is used both as said encryption algorithm for performing said step of encrypting said message, and as said first and said second symmetrical encryption algorithms.

20. Computer readable medium comprising instructions for bringing a processor in a digital pen to perform a method for encrypting a message for secure transmission of said message from the digital pen to a receiver, comprising the steps of obtaining optical data by imaging a portion of a surface provided with a position code pattern using an optical sensor of said digital pen, said optical data representing values of an optical parameter of desired variability read by said optical sensor, obtaining the message by registering images of the surface provided with the position code pattern using the optical sensor of the digital pen, and determining at least one position from the images, generating an encryption key using said optical data as a seed, wherein repeated imaging of the same pattern results in random seeds, encrypting said message using said encryption key in an encryption algorithm.

21. Computer readable medium according to claim 20, wherein the step of generating an encryption key comprises:

processing said optical data according to a predetermined scheme, organizing said processed optical data in data fields, wherein each data field has a predetermined size, and organizing said data fields in a predetermined order in data records.

22. Computer readable medium according to claim 21, wherein the step of generating an encryption key comprises:

rearranging the order of said data fields within at least one data record of a first series of data records according to a first reordering algorithm, thereby obtaining a first series of rearranged data records, rearranging the order of said data fields within at least one data record of a second series of data records according to a second reordering algorithm, thereby obtaining a second series of rearranged data records, and using said first and said second series of rearranged data records as said encryption key.

23. Computer readable medium according to claim 21, wherein the step of generating an encryption key comprises the steps of performing a first hashing using a first hash function on a set of a predetermined number of said data records, thereby obtaining a first hashing output, performing a second hashing using a second hash function on said first hashing output, thereby obtaining a second hashing output, and using said second hashing output as said encryption key.

24. A digital pen device arranged for obtaining a message and for sending said message to a receiver, comprising an optical sensor for obtaining optical data, said optical data representing values of an optical parameter of desired variability read by said optical sensor when imaging a surface provided with a position code pattern;

an encryption device for encrypting the message for secure wireless transmission of said message from the digital pen device to a receiver, the encryption device comprising a processor arranged for receiving the optical data, for generating an encryption key using said optical data as a seed, wherein repeated imaging of the same pattern results in random seeds, and for encrypting the message to be transmitted using said encryption key; and a transmitter for transmitting said encrypted message;

wherein the optical sensor is arranged to register images of the surface provided with the position code pattern and wherein the processor is arranged to obtain the message by determining at least one position from said registered images.

25. The device according to claim 24, wherein said processor is further arranged for processing said optical data according to a predetermined scheme, organizing said processed optical data in data fields, wherein each data field has a predetermined size, organizing said data fields in a predetermined order in data records, performing a first hashing using a first hash function on a set of a predetermined number of said data records, thereby obtaining a first hashing output, performing a second hashing using a second hash function on said first hashing output, thereby obtaining a second hashing output, and using said second hashing output as said encryption key.

26. Device according to claim 24, wherein said position code pattern has optical readable markings.

27. Device according to claim 24, wherein said processor is further arranged to encrypt said message using a symmetric encryption algorithm.

28. Device according to claim 24, wherein said processor is further arranged to use a subset of said optical data as key data for said encryption algorithm, and use a second subset of said optical data as input data for said encryption algorithm.

29. Device according to claim 24, wherein said processor is further arranged for receiving pressure data, and wherein said processor is arranged to generate said encryption key using said pressure data in combination with said optical data.

30. Device according to claim 24, wherein said processor is further arranged to obtain time data, and to generate an encryption key using said time data in combination with said optical data.

31. Device according to claim 24, wherein said processor is further arranged for processing said optical data according to a predetermined scheme, organizing said processed optical data in data fields, wherein each data field has a predetermined size, and organizing said data fields in a predetermined order in data records.

32. Device according to claim 31, wherein said processor is further arranged to calculate statistical properties of sets of said optical parameter values represented by said optical data, whereby said statistical properties constitute said processed optical data.

33. Device according to claim 32, wherein said properties comprise a maximum value, a minimum value and a sum value of said set of optical parameter values, and wherein said processor is further arranged to organize said maximum value in at least one maximum data field, said minimum value in at least one minimum data field, and said sum value in at least one sum data field, and organize said maximum, minimum, and sum data fields in a data record according to said predetermined order.

34. Device according to claim 32, wherein said processor is further arranged to rearrange the order of said data fields within at least one data record of a first series of data records according to a first reordering algorithm, thereby obtaining a first series of rearranged data records, and rearrange the order of said data fields within at least one data record of a second series of data records according to a second reordering algorithm, thereby obtaining a second series of rearranged data records, wherein an encryption key comprises key data and input data, and wherein the processor is further arranged to use said first series of rearranged data records as said key data, and use said second series of rearranged data records as said input data.

35. The device according to claim 32, wherein said processor is further arranged to process a set of a predetermined number of said data records in a first step using a first hash function, thereby obtaining a first output, process said first output in a second step using an iterative algorithm, thereby obtaining a second output, and use said second output as said encryption key or for generating said encryption key.

36. Device according to claim 31, wherein said processor is further arranged to rearrange the order of said data fields within at least one data record of a first series of data records according to a first reordering algorithm, thereby obtaining a first series of rearranged data records, and rearrange the order of said data fields within at least one data record of a second series of data records according to a second reordering algorithm, thereby obtaining a second series of rearranged data records.

37. Device according to claim 36, wherein an encryption key comprises key data and input data, and wherein the processor is further arranged to use said first series of rearranged data records as said key data, and use said second series of rearranged data records as said input data.

38. The device according to claim 31, wherein said processor is further arranged to process a set of a predetermined number of said data records in a first step using a first hash function, thereby obtaining a first output, process said first output in a second step using an iterative algorithm, thereby obtaining a second output, and use said second output as said encryption key or for generating said encryption key.

39. The device according to claim 38, wherein said processor is further arranged to use a second hash function for processing said first output in said second step.

40. The device according to claim 38, wherein in said first and second steps, a first and a second symmetrical encryption algorithm, respectively, is used.

41. The device according to claim 40, wherein said processor is further arranged to use one symmetrical encryption algorithm both as said first and as said second symmetrical encryption algorithms.

42. The device according to claim 40, wherein said processor is further arranged to use one symmetrical encryption algorithm both as said encryption algorithm for performing said step of encrypting said message, and as said first and as said second symmetrical encryption algorithms.

43. An information management system comprising a plurality of products provided with a position code pattern, a plurality of digital pens capable of reading said position code, and a server communicating with said digital pens in at least one communication network, said server including a position data base which associates positions coded by said position code with rules for information management, wherein said digital pens are arranged to communicate to said server information which is registered on said products in the form of at least one position which is coded by said position code, wherein each digital pen comprises an encryption device for encrypting a message for secure wireless transmission of said message from a digital pen to a receiver, the encryption device comprising a processor arranged for receiving optical data from an optical sensor of the digital pen, said optical data representing values of an optical parameter of desired variability read by said optical sensor when imaging a surface provided with a position code pattern, wherein the optical sensor is arranged to register images of the surface provided with the position code pattern, obtaining the message by determining at least one position from said registered images, generating an encryption key using said optical data as a seed, wherein repeated imaging of the same pattern results in random seeds, and encrypting the message to be transmitted using said encryption key.

44. A method in a digital pen for authentication of a sent message, wherein said message is sent from a digital pen to a receiver, comprising the steps of obtaining optical data from an optical sensor of the digital pen, said optical data representing values of an optical parameter of desired variability read by said optical sensor when imaging a surface provided with a position code pattern, obtaining the message by registering images of the surface provided with the position code pattern using the optical sensor of the digital pen, and determining at least one position from the images, using said optical data for generating random number data, wherein repeated imaging of the same pattern results in random numbers, encrypting said random number data, and using said encrypted random number data for authentication of said message.

* * * * *